(12) United States Patent
Roberge et al.

(10) Patent No.: US 8,943,792 B2
(45) Date of Patent: Feb. 3, 2015

(54) GAS-DRIVEN PROPULSOR WITH TIP TURBINE FAN

(75) Inventors: Gary D. Roberge, Tolland, CT (US); Jayant Sabnis, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 766 days.

(21) Appl. No.: 13/172,099

(22) Filed: Jun. 29, 2011

(65) Prior Publication Data
US 2013/0000273 A1   Jan. 3, 2013

(51) Int. Cl.
F02C 1/06 (2006.01)
F02K 3/02 (2006.01)
F02C 3/073 (2006.01)

(52) U.S. Cl.
CPC ............... *F02C 3/073* (2013.01); *Y02T 50/672* (2013.01)
USPC ...................... 60/39.162; 60/226.1

(58) Field of Classification Search
CPC .................. F02K 3/062; F02K 3/065
USPC ............. 60/226.1, 262, 39.162; 415/129, 130
See application file for complete search history.

(56) References Cited

U.S. PATENT DOCUMENTS

| | | | |
|---|---|---|---|
| 2,644,298 A * | 7/1953 | McLeod et al. | 60/226.1 |
| 3,216,654 A * | 11/1965 | Kappus | 417/355 |
| 3,890,060 A * | 6/1975 | Lipstein | 415/119 |
| 4,137,708 A * | 2/1979 | Aspinwall et al. | 60/204 |
| 4,936,526 A | 6/1990 | Gries | |
| 5,340,279 A | 8/1994 | Cycon et al. | |
| 5,351,913 A | 10/1994 | Cycon et al. | |
| 5,364,230 A | 11/1994 | Krauss et al. | |
| 6,339,927 B1 | 1/2002 | DiPietro, Jr. | |
| H002032 H | 7/2002 | DiPietro, Jr. | |
| 7,631,480 B2 | 12/2009 | Suciu et al. | |
| 7,716,914 B2 | 5/2010 | Schilling | |
| 7,845,157 B2 | 12/2010 | Suciu et al. | |
| 7,905,083 B2 | 3/2011 | Orlando et al. | |
| 7,921,634 B2 | 4/2011 | Orlando et al. | |
| 7,926,259 B2 | 4/2011 | Orlando et al. | |
| 7,937,927 B2 * | 5/2011 | Suciu et al. | 60/39.162 |
| 8,127,528 B2 * | 3/2012 | Roberge | 60/226.1 |
| 2006/0086078 A1 * | 4/2006 | Paul | 60/226.1 |
| 2009/0071121 A1 * | 3/2009 | Suciu et al. | 60/226.1 |
| 2009/0145136 A1 | 6/2009 | Norris et al. | |
| 2009/0148297 A1 | 6/2009 | Suciu et al. | |
| 2009/0211221 A1 * | 8/2009 | Roberge | 60/226.1 |
| 2009/0232650 A1 | 9/2009 | Suciu et al. | |
| 2010/0180572 A1 * | 7/2010 | Wadia et al. | 60/226.1 |

FOREIGN PATENT DOCUMENTS

EP   1340903 B1   4/2011

OTHER PUBLICATIONS

Tyler, J.M., and Sofrin, T.G. "Axial Flow Compressor Noise Studies". SAE. New York. pp. 309-332. (1961).

* cited by examiner

*Primary Examiner* — Gerald L Sung
(74) *Attorney, Agent, or Firm* — Kinney & Lange, P.A.

(57) ABSTRACT

An engine comprises a gas generator having an exhaust plenum and a propulsor comprising a propulsion fan coaxially mounted within an annular turbine. The annular turbine comprises a turbine duct and a plurality of turbine rotor blades rotationally coupled to the propulsion fan. A plurality of hollow struts extend axially and radially from the gas generator to the annular turbine. The hollow struts comprise flow ducts connecting the exhaust plenum to the turbine duct.

12 Claims, 2 Drawing Sheets

GAS-DRIVEN PROPULSOR WITH TIP TURBINE FAN

BACKGROUND

This invention relates generally to gas turbine engines, and specifically to turbine engines for aircraft. In particular, the invention concerns a gas turbine engine with an aft-mounted propulsor assembly.

Turbine engines provide efficient, reliable power for a wide range of industrial applications, including aviation, power generation, and commercial heating and cooling. Gas turbine engines (or combustion turbines) are built around a power core made up of a compressor, combustor and turbine, arranged in flow series with an upstream inlet and downstream exhaust.

The compressor compresses air from the inlet, which is mixed which fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Large-scale gas turbine engines may include a number of different compressor and turbine sections, which are arranged into coaxially nested spools. The spools operate at different pressures and temperatures, and rotate at different speeds. Individual compressor and turbine sections are subdivided into a number of stages, which are formed of alternating rows of rotor blade and stator vane airfoils. The airfoils are shaped to turn, accelerate and compress the gas flow, and to generate lift for conversion to rotational energy in the turbine.

Traditional aviation applications include turbojet, turbofan, turboprop and turboshaft engines. Turbojet engines are an older design, in which thrust is generated primarily from the exhaust. Modern fixed-wing aircraft typically employ turbofan and turboprop configurations, in which the low spool is coupled to a propulsion fan or propeller. Turboshaft engines are used on helicopters and other rotary-wing aircraft.

Turboprop and turboshaft engines usually include reduction gearboxes to decrease blade tip speeds. The reduction ratio is generally higher for turboshaft engines, due to the larger size of the rotor. Advanced turbofan engines may also include geared drive mechanisms, providing independent fan speed control for increased efficiency and reduced engine noise.

Most commercial and general-purpose military aircraft are powered by two- or three-spool turbine engines, in either a turboprop or high-bypass turbofan configuration. High-bypass turbofans generate most of their thrust via the propulsion fan, which drives airflow through a bypass duct oriented around the engine core. Turboprop engines typically employ open-rotor propeller designs, but ducted propellers and unducted turbofans are also known.

Low-bypass turbofan engines are used on supersonic fighters and other high-performance aircraft. Low-bypass turbofans generate less thrust from the bypass flow and more from the engine core, delivering greater specific thrust but incurring additional costs in noise and fuel efficiency.

As commercial engines trend toward higher bypass designs, engine performance depends on precise control of the fan speed and fan pressure ratio, and the corresponding cost and weight penalties for complex gearing and reduction-drive mechanisms. The problem is particularly evident in the blade tip region, where traditional turbofans and unducted propeller blades operate at transonic and supersonic velocities, resulting in shock wave formation, noise generation, and loss of efficiency.

SUMMARY

This invention is directed to a propulsion engine based on a gas generator and high-bypass propulsor. The propulsor includes a propulsion fan coaxially mounted inside an annular turbine assembly. The turbine assembly includes a turbine duct and a plurality of turbine rotor blades, which are rotationally coupled to the propulsion fan.

The gas generator supplies hot combustion gas to an exhaust plenum. A number of hollow struts extend from the gas generator to the annular turbine assembly, connecting the exhaust plenum to the turbine duct. Hot combustion gas from the exhaust plenum flows through the hollow struts to drive the turbine rotor blades, which in turn drive the propulsion fan.

DETAILED DESCRIPTION

Figure 1:
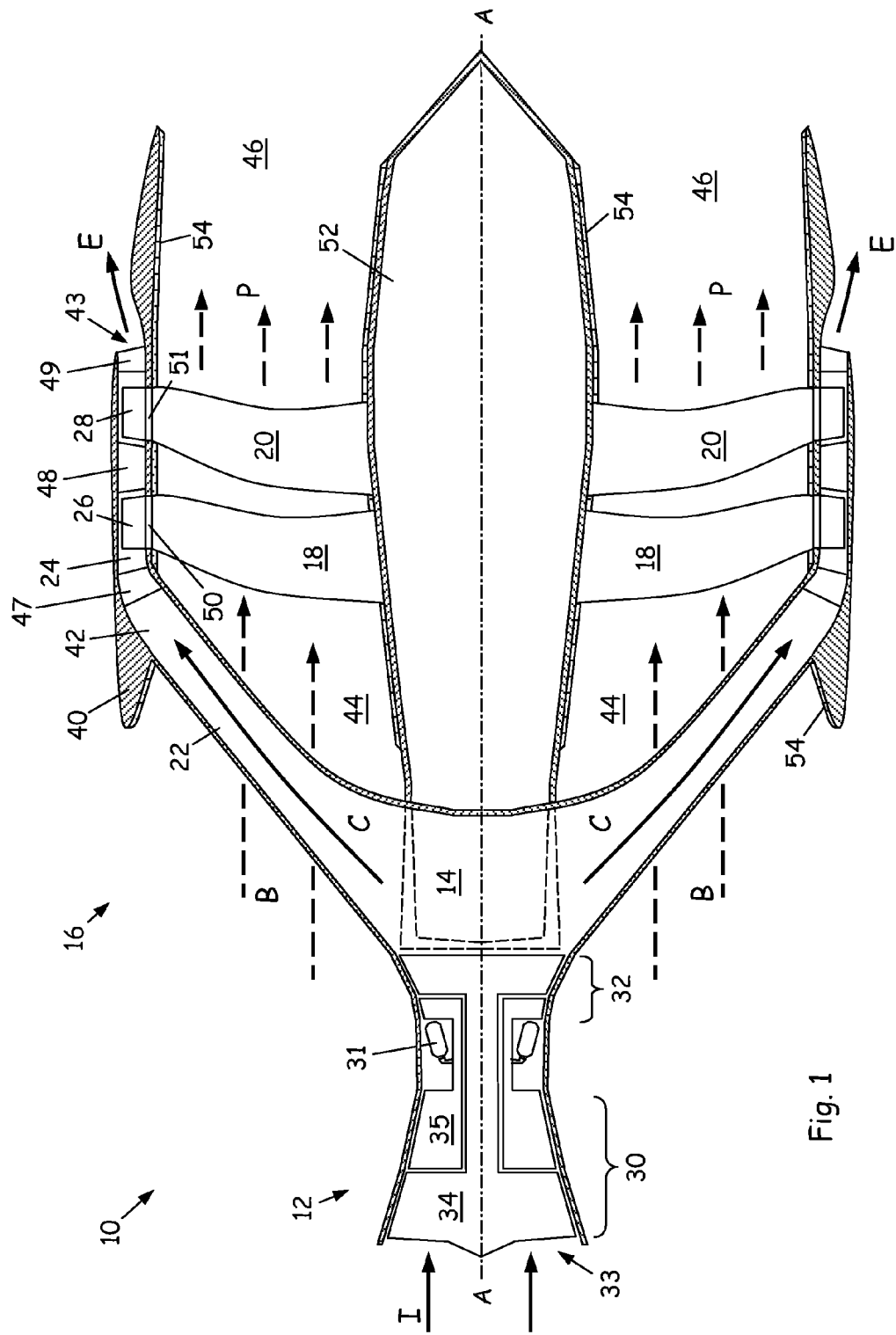
FIG. 1 is a cross-sectional schematic view of a propulsion engine with counter-rotating tip turbine fans.

FIG. 1 is a cross-sectional view of propulsion engine 10. Propulsion engine 10 includes gas generator 12 for generating gas in exhaust plenum 14, and aft-mounted propulsor 16 with two-stage propulsion fans 18 and 20. Combustion gas from exhaust plenum 14 flows through hollow struts 22 to annular turbine duct 24, driving turbine rotor stages 26 and 28. Turbine stages 26 and 28 are rotationally coupled to fan stages 18 and 20, respectively.

Gas generator (or gas turbine) 12 includes compressor section 30, combustor 31 and turbine section 32, arranged in flow series about rotational axis A with upstream inlet 33 and downstream exhaust plenum 14. As shown in FIG. 1, gas generator 12 has a two spool configuration, with low-pressure spool 34 and high-pressure spool 35. Alternatively, gas generator 12 is a one-spool turbine engine, or there are three or more spools.

Propulsor 16 comprises propulsion fan stages (or fan rotors) 18 and 20, struts 22 and nacelle 40. Nacelle 40 houses an annular turbine assembly formed by turbine duct 24, with tip turbine rotor stages 26 and 28.

A plurality of circumferentially spaced hollow struts 22 extend radially outward and axially aft (downstream) from gas generator 12 to nacelle 40. Struts 22 provide structural support for nacelle 40, with internal flow ducts to supply combustion gas from exhaust plenum 14 to turbine duct 24.

In operation of propulsion engine 10, inlet flow I is compressed by compressor section 30 of gas generator 12, then mixed with fuel and ignited in combustor 31 to provide hot combustion gas for turbine section 32. Turbine section 32 drives compressor section 30, and partially-expanded combustion gas flow C passes from exhaust plenum 14 through hollow struts 22 to inlet plenum 42 of annular turbine duct 24. Turbine rotor stages 26 and 28 extract rotational energy from the combustion gas, driving fan stages 18 and 20, and exhaust flow E exits turbine duct 24 via turbine exhaust nozzle 43.

Gas generator 12 has a high overall pressure ratio, for example 35:1 to 50:1 or higher, for thermally efficient gas generation over a wide operating range. In contrast to traditional turbofan engine designs, however, the expansion ratio across turbine section 32 is relatively low. This provides sufficient power to rotate low spool 34 and high spool 35, driving compressor section 30 of gas generator 12 while preserving most of the combustion energy for use in turbine rotor stages 26 and 28 of propulsor 16.

Turbine rotor stages 26 and 28 drive fan stages 18 and 20. Bypass airflow B enters fan inlet 44 between circumferentially spaced struts 22, and fan stages 18 and 20 compress the incoming to generate propulsive thrust flow P through fan exit nozzle 46.

Turbine duct 24 may include one or more guide vane stages 47, 48 and 49 to direct and turn the combustion gas flow, for more efficient operation of turbine rotor stages 26 and 28. In some designs, one or more of turbine vane stages 47, 48 and 49 is actuated to provide a variable-area section within turbine duct 24, in order to regulate flow and control the expansion ratios across turbine rotor stages 26 and 28.

These configurations allow propulsor 16 to balance fan loading and modulate the compression ratio across upstream (first stage) fan rotor 18 and downstream (second stage) fan rotor 20, in order to control thrust output of propulsion engine 10. Alternatively, one or more of turbine vane stages 47, 48 and 49 is formed as an aerodynamic fairing, with minimal effect on the flow of combustion gas through turbine duct 24.

Turbine rotor stages 26 and 28 are mounted to the blade tip regions of fan stages 18 and 20, along annular ring assemblies 50 and 51. Ring assemblies 50 and 51 form platform structures along the inner radius of turbine rotor stages 26 and 28, and shroud structures along the outer radius of fan stages 18 and 20.

The outer diameter (OD) of the fan duct (or fan flowpath) extends upstream and downstream of ring assemblies 50 and 51, along the radially inner surface of nacelle 40. The inner diameter (ID) of the fan duct is defined along the radially outer surface of fan support structure 52, extending upstream and downstream fan stages 18 and 20. Both the ID and OD fan duct may include acoustic treatments 54, for example a honeycomb cell structure with a porous face sheet, or other sound or noise-absorbing material.

Propulsion engine 10 and propulsor 16 exhibit a very high or ultra-high bypass design, as compared to traditional turbofan engines, with bypass ratio greater than 10:1 or greater than 12:1. In some configurations, the bypass ratio is greater than 15:1, or between 15:1 and 20:1. Alternatively, the bypass ratio is greater than 20:1.

The overall fan pressure ratio is correspondingly smaller than in traditional designs, as measured from fan inlet 44 to fan exit nozzle 46, including one or more fan stages 18 and 20. In one configuration, the fan pressure ratio is less than 1.5:1, for example between 1.15:1 and 1.25:1. Alternatively, the fan pressure ratio is less than 1.25:1, for example between 1.10:1 and 1.20:1, or between 1.10:1 and 1.15:1.

For these operating parameters, fan stages 18 and 20 rotate more slowly than other turbofan designs, increasing efficiency in both single-rotor and multiple fan stage designs, as shown in FIG. 1. Lower compression ratios and rotational speeds also reduce shock wave formation and noise generation, particularly in the blade tip region where blade speed is highest.

Because tip-mounted turbine rotor stages 26 and 28 are coupled to the outer radius of fan stages 18 and 20, the turbine blades have higher tip speeds than the fan blades. This contrasts with conventional direct-drive turbofan designs, in which the fan rotor extends radially outward of the turbine, and the fan blade tip speeds are higher that the turbine blade tip speeds. By placing the turbine on the tip of the fan, propulsion engine 10 takes advantage of the higher wheel speed and associated advantages in efficiency that come along with this speed.

Propulsion engine 10 thus reduces or eliminates the need for reduction gears and multiple-spooling systems to reduce fan speed. In addition, turbine rotor stages 26 and 28 are directly coupled to fan stages 18 and 20 at integral platform/shroud ring assemblies 50 and 51, reducing or eliminating the need for a separate fan shaft and reducing torque and loading on low spool 34 of gas generator 12. This eases the impact of shaft sizing on system rotor dynamics, allowing for shorter, lighter, thinner-walled shaft assemblies. Taken together, these effects provide gas generator 12 with smaller and more radially compact design options, increasing efficiency and reliability by reducing centrifugal loading at high rotational speeds.

In contrast to open-rotor designs, nacelle 40 also provides acoustic treatments 54 to further reduce sound or noise levels, for example along the inner and outer diameters of fan inlet 44 and fan exit nozzle 46, as shown in FIG. 1. In combination with the lower speed and compression ratios of fan stages 18 and 20, acoustic treatments 54 reduce the net level of environmental noise, allowing propulsion engine 10 to operate along more efficient flight paths and with reduced rates of climb and descent, in accordance with local noise regulations and population distributions.

In addition, there are noise advantages of a low profile. Large circumference turbine exhaust nozzle (or discharge) 43 can promote more rapid mixing of exhaust flow E, and possibly higher frequency tones.

Figure 2:
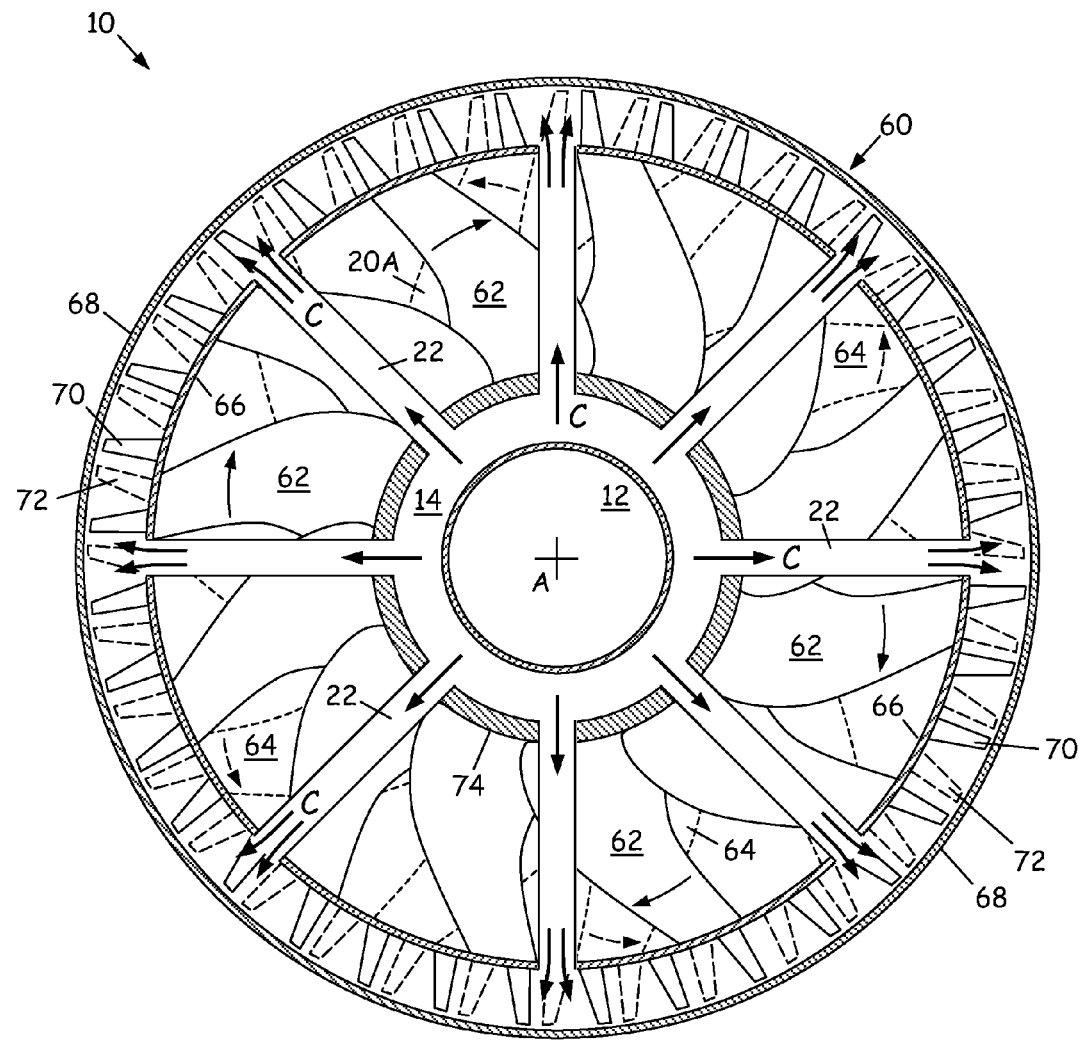
FIG. 2 is a schematic axial view of the propulsion engine in FIG. 1.

FIG. 2 is an axial schematic view of propulsion engine 10, shown in a downstream direction along rotational axis A. Gas generator 12 exhausts combustion gas to plenum 14, as described above. Circumferentially spaced hollow struts 22 act as passages to duct combustion gas flow C from exhaust plenum 14 to annular tip turbine assembly 60, located about the periphery of fan stages 18 and 20 (see FIG. 1), with first-stage fan blades 62 (solid lines) and second-stage fan blades 64 (dashed lines), respectively.

Annular tip turbine assembly 60 is formed in nacelle 40 of FIG. 1. Turbine assembly 60 comprises inner diameter turbine ring 66, outer diameter turbine ring 68 and rotating stages of tip-mounted turbine blades 70 (solid lines) and 72 (dashed lines), corresponding to turbine rotor stages 26 and 28, respectively (see FIG. 1).

In the tip turbine design of FIG. 2, ID turbine ring 66 is integral with the OD fan shroud (or shrouds) for fan blades 62 and 64, and the ID platform (or platforms) for (tip) turbine blades 70 and 72. The ID boundaries of the fan stages are defined by fan rotor hub (or hubs) 74.

First-stage turbine blades 70 drive first-stage fan blades 62 into rotation about axis A, via the expansion of combustion gas flow C. Similarly, second-stage turbine blades 72 drive second-stage fan blades 64 into coaxial rotation with first-stage fan blades 62.

In one configuration, fan blades 62 and 64 counter-rotate about axis A, with first-stage turbine blades 70 rotating first-stage (upstream) fan blades 62 in a clockwise sense, as shown in FIG. 2, and second-stage turbine blades 72 rotating second-stage (downstream) fan blades 64 in a counter-clockwise sense. In other configurations, the directions of rotation are reversed. Alternatively, fan blades 62 and 64 and turbine blades 70 and 72 rotate in the same direction about axis A, either clockwise or counter-clockwise.

Because the radius of turbine assembly 60 is larger than in conventional turbofan designs, there are typically more individual blades 70 and 72 in each stage, as compared to a conventional turbofan. The fans have low mechanical speed, but since fan blades 62 and 64 are larger than convention fan blades the tip speed on turbine blades 70 and 72 is actually fairly high. This minimizes the mismatch seen in typical fan drive turbines, providing an alternate approach to effects which are also addressed by geared turbofan designs.

The circumference for the turbine mean span is also high, resulting in a large number of relatively short turbine blades. This reduces individual turbine blade loading, as compared to a traditional turbofan with combustion gas flow directed along the core (inner diameter) flowpath. As a result, turbine assembly 60 can operate more efficiently at lower temperatures and pressures, as compared to gas generator 12. The approach offers different mechanical design solutions as well, and direct drive on tip of the fan eliminates the fan drive turbine shaft that would exist in conventional architectures.

In addition, the turbine disc (or platform structure) at ID turbine ring 66 is formed integrally with the fan blade reinforcing ring (or shroud). This reduces cooling and mechanical requirements, allowing propulsion engine 10 to utilize uncooled designs for turbine blades 70 and 72. Turbine blades 70 and 72 can also be made with lighter, non-metallic materials such as ceramic-matrix composites (CMCs) and carbon fiber-based materials.

As shown in FIG. 2, the blading on the upstream and downstream fan stages 18 and 20 can also be varied, reducing constructive interference and overall noise impact. In particular, the number of upstream fan blades 62 may be different from the number of downstream fan blades 64, and the different numbers of fan blades can be selected to reduce the generation of high-frequency spinning modes above the critical tip Mach number, as defined by the geometry of the fan duct. This reduces noise levels by shifting acoustic energy from high-frequency propagating modes to lower-frequency non-propagating modes, and to modes that are more efficiently absorbed by the acoustic treatments lining the fan duct.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An assembly for an aircraft engine comprising:
 a gas generator having an exhaust plenum;
 a propulsor comprising a propulsion fan coaxially mounted within an annular turbine assembly, wherein the propulsion fan comprises first and second fan stages coaxially mounted within the annular turbine assembly, wherein the first and second fan stages are counter-rotating, wherein the first and second fan stages comprise different numbers of fan blades, and wherein the annular turbine assembly comprises a turbine duct and a plurality of turbine rotor blades rotationally coupled to the propulsion fan; and
 a plurality of hollow struts extending axially and radially from the gas generator to the annular turbine assembly, the hollow struts comprising flow ducts connecting the exhaust plenum to the turbine duct.

2. The assembly of claim 1, wherein the turbine rotor blades are rotationally coupled to the propulsion fan along an annular ring assembly, the annular ring assembly forming a platform for the turbine rotor blades and a shroud for the propulsion fan.

3. The assembly of claim 1, wherein the annular turbine assembly comprises first and second turbine rotor stages individually coupled to the first and second fan stages.

4. The assembly of claim 3, further comprising a variable vane stage positioned within the turbine duct to regulate an expansion ratio across the first and second turbine rotor stages.

5. The assembly of claim 1, wherein plurality of hollow struts extend axially downstream from the gas generator to the annular turbine assembly, such that the propulsion fan assembly is mounted aft of the gas generator.

6. An assembly for a propulsion engine comprising:
 a gas turbine including a compressor, a combustor and a turbine in flow series with an exhaust plenum;
 a nacelle comprising an annular turbine assembly having a turbine rotor stage and a counter-rotating turbine rotor stage in flow series with the exhaust plenum, wherein the nacelle and annular turbine assembly are disposed aft of the gas turbine engine, are axially aligned with the gas turbine engine, and the annular turbine assembly is in flow series with the exhaust plenum; and
 a plurality of hollow struts extending both axially aft and radially outward from the gas turbine to the annular turbine assembly, wherein the plurality of hollow struts comprise flow ducts that are configured to direct gas flow from the exhaust plenum through the plurality of hollow struts and to the annular turbine assembly; and
 a propulsion fan comprising:
  a fan stage mounted within the nacelle, radially inward of the annular turbine assembly and rotationally coupled to the turbine rotor stage; and
  a counter-rotating fan stage mounted within the nacelle, radially inward of the annular turbine assembly and rotationally coupled to the counter-rotating turbine rotor stage;
 wherein the fan stage and the counter-rotating fan stage comprise different numbers of fan blades, the different numbers of fan blades are selected to shift acoustic energy from higher-frequency propagating modes to lower-frequency non-propagating modes.

7. The assembly of claim 6, further comprising a ring assembly configured to rotationally couple the fan stage to the turbine rotor stage, the ring assembly forming a radially outer shroud for the fan stage and a radially inner platform for the turbine rotor stage.

8. The assembly of claim 6, wherein the annular turbine assembly comprises a variable stator stage in flow series with the exhaust plenum, the variable stator stage configured to regulate an expansion ratio across the counter-rotating turbine rotor stage to control loading on the counter-rotating fan stage.

9. The assembly of claim 6, further comprising an acoustic treatment lining a radially inner surface of the nacelle, the acoustic treatment configured to absorb sound energy in the higher-frequency propagating modes.

10. An assembly for an aircraft engine comprising:
 a gas generator in flow series with an exhaust plenum;
 a tip turbine assembly in flow series with the exhaust plenum and axially aligned with the gas generator, the tip turbine assembly comprising counter-rotating turbine stages in a turbine duct;
 a plurality of hollow struts extending both radially outward from the gas generator and axially aft of the gas generator to the tip turbine assembly, the hollow struts comprising flow ducts that are configured to direct gas flow from the exhaust plenum through the hollow struts and to the turbine duct; and a fan assembly coaxially mounted inside the tip turbine assembly, the propulsion fan assembly comprising counter-rotating fan stages rotationally coupled to the counter-rotating turbine stages, wherein the counter-rotating fan stages comprise different numbers of fan blades to reduce noise generation in high-frequency propagating modes.

11. The assembly of claim 10, further comprising counter-rotating ring assemblies coupling a radially inner portion of the counter-rotating turbine rotor stages to a radially outer portion of the counter-rotating fan stages.

12. The assembly of claim 10, wherein the tip turbine assembly comprises a variable stator vane stage to control loading on the counter-rotating fan stages by regulating an expansion ratio across the counter-rotating turbine rotor stages.

* * * * *